W. TODD.

Wash-Board.

No. 6,673. Reissued Oct. 5, 1875.

Witnesses Claudius B. Parker
James McLeod

Inventor: Westley Todd
By George H. Christy, Atty for him and his Assignees

BEST AVAILABLE COPY

UNITED STATES PATENT OFFICE.

WESTLY TODD, OF OTTOKEE, OHIO, ASSIGNOR, BY MESNE ASSIGNMENTS, TO MRS. P. DUFF, E. A. KITZMILLER, AND R. P. DUFF, OF WILKINS TOWNSHIP, ALLEGHENY COUNTY, PENNSYLVANIA.

IMPROVEMENT IN WASH-BOARDS.

Specification forming part of Letters Patent No. 111,585, dated February 7, 1871; reissue No. 6,673, dated October 5, 1875; application filed September 7, 1875.

*To all whom it may concern:*

Be it known that I, WESTLY TODD, late of the city and county of Allegheny and State of Pennsylvania, but now of Ottokee, Fulton county, Ohio, have invented a new and useful Improvement in Wash-Boards; and I do hereby declare that the following is a full, clear, and exact description thereof, reference being had to the accompanying drawing and to the letters of reference marked thereon.

The nature of my invention consists in the construction of a sheet-metal wash-board with a rubbing-face longitudinally and transversely corrugated or ribbed, whereby such rubbing-surface shall be made up of a series of projections, bounded by a series of horizontal, vertical, and angularly-shaped grooves. The rubbing-face somewhat resembles the face of a rasp or file in general appearance, though the projections are less sharp and angular.

To enable others skilled in the art to make and use my invention, I will proceed to describe more fully its construction.

Figure 1:
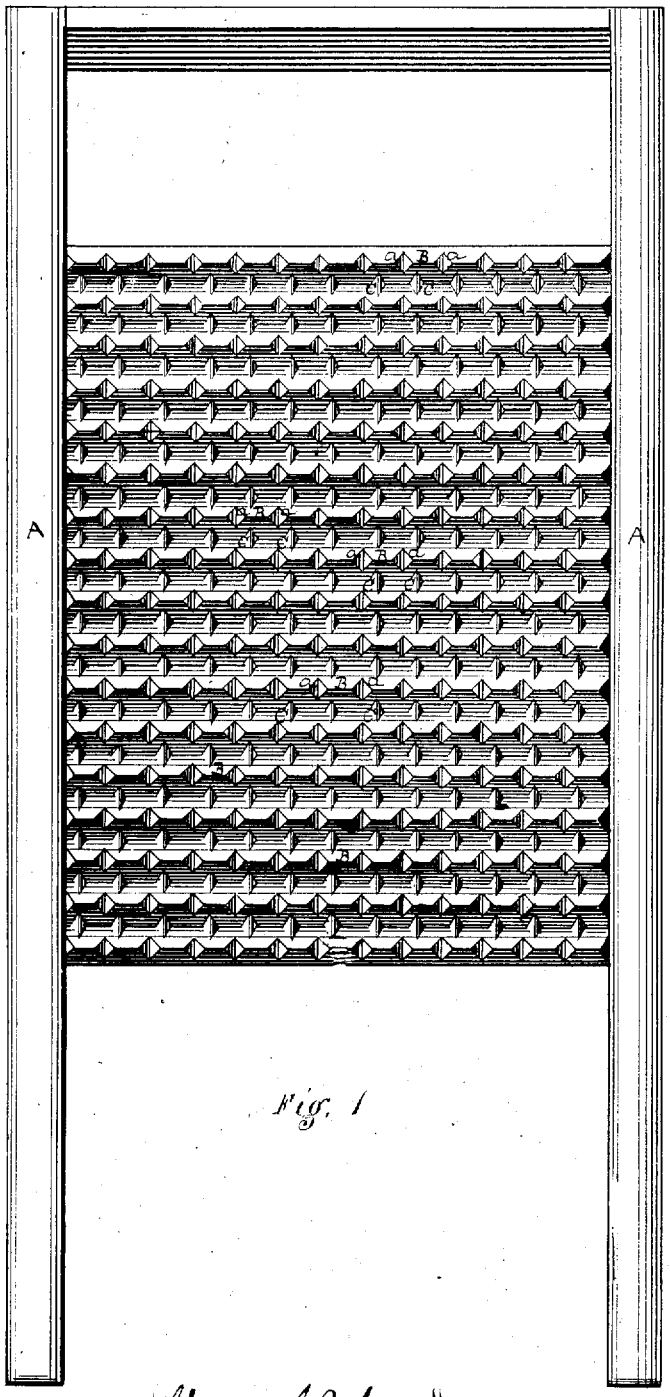
Figure 2:
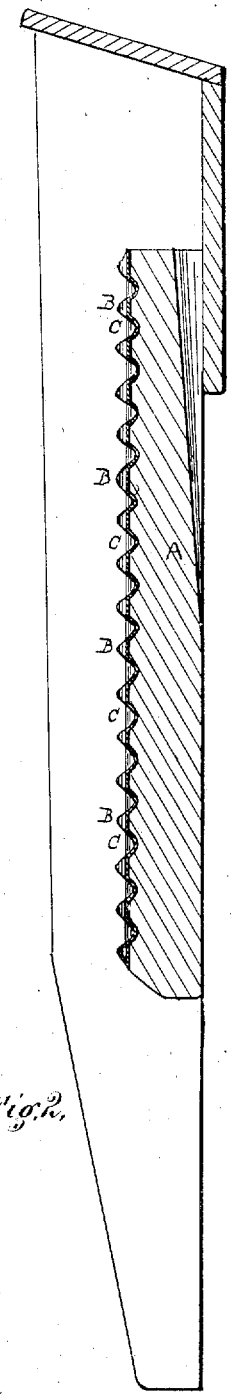

In the accompanying drawing, which forms part of my specification, Figure 1 represents a front elevation of my improvement in wash-boards. Fig. 2 is a vertical section of the same.

In the accompanying drawing, A represents the frame of the wash-board, and is of ordinary construction. The rubbing-surface is formed of sheet zinc or other suitable sheet metal, corrugated or provided with a series of raised portions, B, alternating along the line of the corrugation or rib which forms them, with depressions or unraised portions *a*, the corrugations and depressions extending in either direction across the sheet, so that a series of horizontal and vertical, and also angularly-shaped, grooves are formed between the projections. Each projection B represents four inclined surfaces sloping from the apex of the projection into the grooves which surround and bound it. The grooves between the corrugations are also broken or interrupted at intervals by small projections or raised portions C, each of which presents two lateral surfaces.

In a wash-board thus longitudinally and transversely ribbed or corrugated the inequalities of the rubbing-surfaces are such that the desired effect is more readily and effectively attained, whereby the labor of washing is greatly diminished, and is accomplished with ease and facility, and with less than the usual wear on the clothes.

I claim herein as my invention—

1. A sheet-metal wash-board having a series of raised projections, B, each bounded by longitudinal and transverse grooves or depressions, substantially as set forth.

2. In a sheet-metal wash-board the projections B, each bounded by grooves or depressions, in combination with raised projections C in the bottoms of the interlying grooves, substantially as set forth.

3. As a new article of manufacture a sheet-metal wash-board, having a rubbing-face both longitudinally and transversely ribbed or corrugated, substantially as set forth.

In testimony whereof I have hereunto set my hand.

WESTLY TODD.

Witnesses:

ED. A. KITZMILLER,

J. S. RIDDLE.